United States Patent [19]

Kobayashi

[11] Patent Number: 4,631,552
[45] Date of Patent: Dec. 23, 1986

[54] THERMAL RECORDER PAPER STACKER

[75] Inventor: Shouzou Kobayashi, Hachioji, Japan

[73] Assignee: Kabushiki Kaisha Toshiba, Kawasaki, Japan

[21] Appl. No.: 703,495

[22] Filed: Feb. 20, 1985

[30] Foreign Application Priority Data

Feb. 28, 1984 [JP] Japan .............................. 59-26698[U]

[51] Int. Cl.⁴ ..................... G01D 15/24; G01D 15/00; B41J 11/26
[52] U.S. Cl. ................................... 346/136; 346/145; 400/613.2
[58] Field of Search ..................... 346/136, 145, 76 R; 400/613.2

[56] References Cited

U.S. PATENT DOCUMENTS 3,334,722 8/1967 Bernard ............................ 400/613.2
3,946,406 3/1976 Miura ................................... 346/145
4,107,700 8/1978 Jornod ................................ 346/136

FOREIGN PATENT DOCUMENTS 52-15810 11/1977 Japan .
52-43319 12/1977 Japan .

OTHER PUBLICATIONS

Hard Copy Technology; Japan Industrial Technology Center; Jun. 1981.

Primary Examiner—E. A. Goldberg
Assistant Examiner—Mark Reinhart
Attorney, Agent, or Firm—Oblon, Fisher, Spivak, McClelland & Maier

[57] ABSTRACT

A recorder having a tray for receiving a stack of folded fanfold recording paper that has been recorded, wherein the tray includes an assisting member disposed substantially centrally on a paper supporting surface of the tray in a transverse direction of the recording paper. The assisting member assists the recording paper in being folded by raising a transverse central portion of the stack of the folded fanfold recording paper to a prescribed height. Guides are provided on the paper supporting surface of the tray and spaced at an interval substantially equal to the width of the recording paper for initially positioning the recording paper on the paper supporting surface. At least one of the assisting member and the paper supporting surface is inclined for increasing the height of the stacked recording paper at the front side thereof in a direction normal to the width of the recording paper.

2 Claims, 10 Drawing Figures

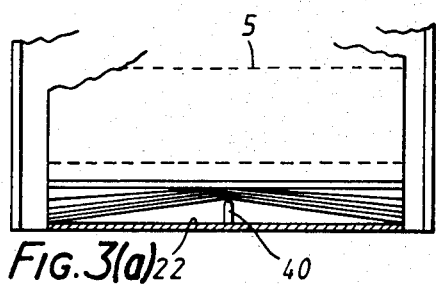
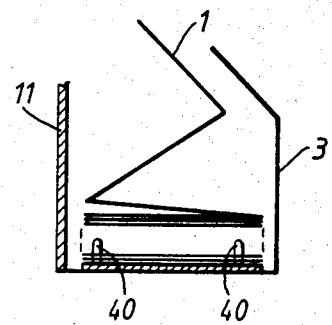
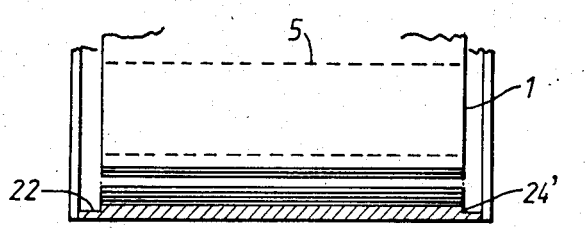
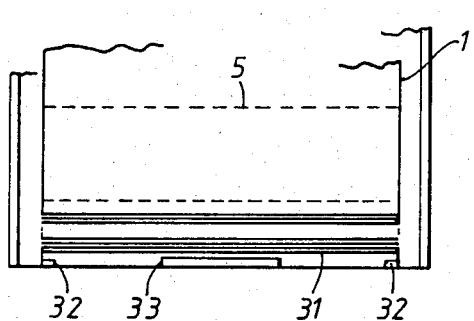
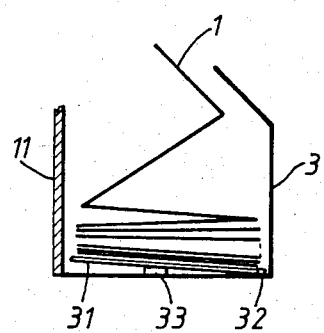
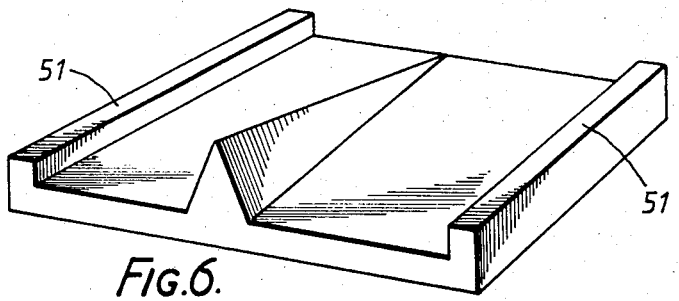

THERMAL RECORDER PAPER STACKER

BACKGROUND OF THE INVENTION

1. Field of the Invention

This invention relates to a recorder using fanfold recording paper, and more particularly to a recorder having an improved tray for accommodating fanfold recording paper as a folded stack after recording of information on the paper.

2. Description of Prior Invention

FIGS. 1(a) and 1(b) of the accompanying drawings show a prior recorder known to applicant and having a platen roller 9 for feeding fanfold recording paper 1. Desired data items are recorded on the recording paper 1 by feeding the paper between the platten 9 and a thermal head 7 pressing against the paper and the platen roller under the force of a pressing spring 6. Since the recording paper 1 is pressed against the paper 1 and the platen roller 9, perforations in the recording paper 1 provided for folding of the paper are also pressed and flattened by the heat of the thermal head 7, with the result that the recording paper 1 becomes less liable to be folded at the perforations.

The recording paper has its recording surface disposed closely to a front transparent panel 11 in order for the data items recorded on the recording paper 1 to be easily observable from the outside. It follows therefore that a force is imposed by the downflowing recording paper on the front side of the stack of the recording paper 1, which has a front height A' smaller than the rear height A thereof. As the paper stack height increases, the top of the front side of the stack is brought into contact with the front transparent panel 11. The paper stack is spaced rearwardly from the front transparent panel 11 by a gap B which becomes progressively smaller as the paper stack grows, until finally the gap B is eliminated at a certain height. When the front transparent panel 11 is opened, therefore, the folded recording paper 1 will collapse and fall down out of a paper tray 12.

If the recorded paper happens to be initially placed in the paper tray 12 with a positional deviation C as shown in FIG. 1(b), then a row of perforations 5 will be tilted by h and the feed of subsequent recording paper 1 to be folded will become unstable.

There is known to applicant a line printer including a body arranged for assisting the paper to be folded in a direction normal to a transverse direction of the paper so as to flatten folds. However, the assisting body is only effective in preventing the folds from being raised.

SUMMARY OF THE INVENTION

Accordingly an object of the present invention is to provide a novel recorder in which recording paper is prevented from being piled at different heights at front and rear sides in a recording paper tray.

Another object of the present invention is to provide a novel recorder in which a stack of folded recording paper is prevented from collapsing downwardly in a forward direction out of a recording paper tray.

Still another object of the present invention is to provide a novel recorder in which perforations in recording paper are prevented from being tilted due to an initial positional deviation of the paper in a recording paper tray.

These and other objects are achieved according to the present invention, by providing a novel recorder having a tray for receiving a stack of folded fanfold recording paper that has had data items recorded thereon, the tray including an assisting member disposed substantially centrally on a paper supporting surface of the tray in a transverse direction of the recording paper, for assisting the recording paper in being folded by raising a transversely central portion of the stack of the folded fanfold recording paper to a prescribed height, and guides mounted on the paper supporting surface of the tray and spaced at an interval substantially equal to the width of the recording paper for initially positioning the recording paper on the paper supporting surface. At least one of the assisting members and the paper supporting surface is inclined for increasing the height of the stacked recording paper at a front side thereof in a direction normal to the width of the recording paper.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 3(a) and 3(b) are fragmentary sectional front and side elevational views, respectively, showing a body for assisting recording paper to be folded according to another embodiment of the present invention;

FIG. 4 is a fragmentary sectional front elevational view of guides for initially positioning recording paper according to another embodiment of the present invention;

FIGS. 5(a) and 5(b) are fragmentary sectional front and side elevational views, respectively, illustrative of a recording paper supporting surface according to another embodiment of the present invention; and FIG. 6 is a perspective view of a recording paper supporting surface and guides for initially positioning recording paper in accordance with still another embodiment of the present invention.

DESCRIPTION OF THE PREFERRED EMBODIMENTS

Figure 2A:
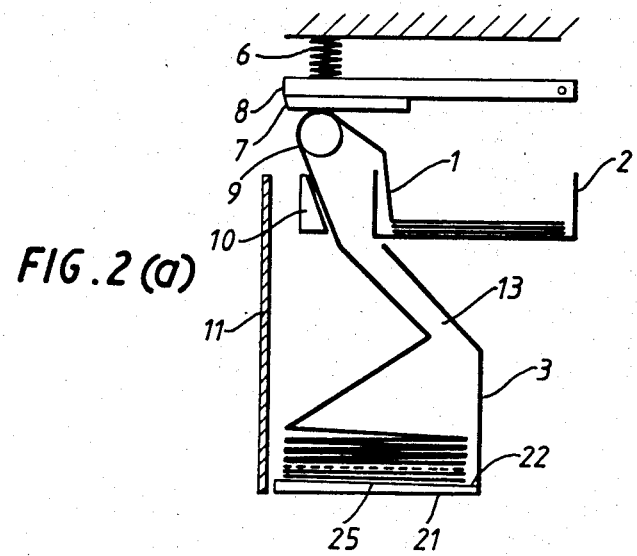
FIGS. 2(a) and 2(b) are sectional side and front elevational views, respectively, of a recorder using fanfold recording paper according to the present invention.
Figure 2B:
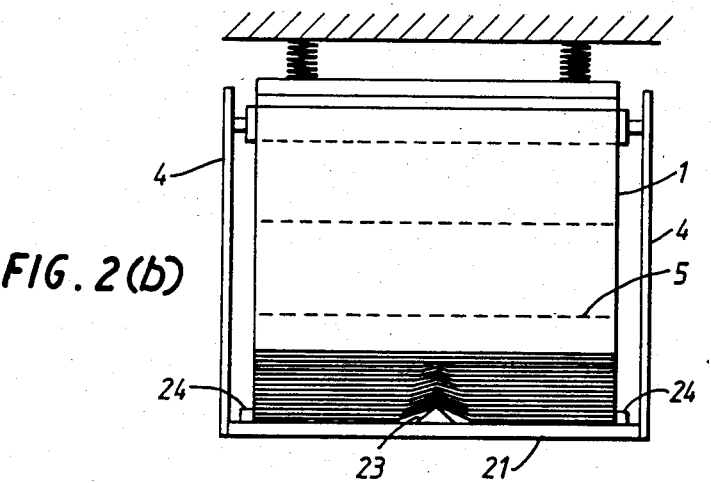

Referring now to the drawings, wherein like reference numerals designate identical or corresponding parts throughout the several views, FIGS. 2(a) and 2(b) illustrate a recording paper using fanfold recording paper according to an embodiment of the present invention. Designated at 1 is fanfold recording paper, 2 a detachable cassette container for containing a stack of the recording paper, 3 a back plate, 4 a pair of spaced side panels, 5 perforations in the recording paper 1 along which it is foldable, 6 pressing springs, 7 a thermal head, 8 an attachment plate on which the thermal head 7 is mounted, 9 a platen roller, 10 a paper folding guide, 11 a front transparent panel, 21 a tray for receiving the recording paper, and 13 a feed path. The tray 21 has a recording paper supporting surface 22 on which the recording paper with data items recorded thereon is stacked as folded. On the recording paper supporting surface 22, there is mounted a bar-shaped assisting member 23 having a triangular cross section for assisting folding of a stack of the recording paper. The assisting member 23 is disposed substantially centrally in a transverse direction of the recording paper 1 and has a length substantially equal to the length (between folded edges along perforations) of folded sheets of the recording paper 1 and is placed along a minor surface of the supporting structure (that is only covering a small portion thereof in the width direction of the paper). The assisting member 23 extends perpendicularly to the width of the recording paper with its triangular cross section having a vertex directed upwardly. The assisting member 23 has a height selected in the range of from 10 to 20 mm dependent on the thickness and rigidity of the recording paper.

Guides 24 in the form of rectangular bars for initially positioning the recording paper are disposed on the recording paper supporting surface 22 with one guide on each side of the center in the transverse direction of the recording paper. The guides 24 are spaced from each other by an interval substantially equal, with a slight margin added, to the width of the recording paper. The guides 24 extend in a direction normal to the transverse direction of the recording paper. The guides 24 have a height equal to the thickness of five to six folded sheets of the recording paper at the time it is initially positioned. The guides 24 may not necessarily be in the form of continuous rectangular bars, but may comprise bars with cuts or recesses spaced at constant pitches.

The recording paper supporting surface 22 includes an inclined surface 25 higher on the front side of the recorder in a direction normal to the transverse direction of the recording paper. The degree of inclination of the surface 25 depends on the length (between adjacent rows of perforations) of the folded recording paper, but may be such that the front side is 2 to 3 mm higher than the rear side with respect to the length between the rows of perforations on the front and rear sides of the folded recording paper as stored in the tray.

Next described is the operation of the recorder according to the above embodiment of the present invention. When a new stack of folded recording paper 1 is set in the container 2, the leading end of the recording paper 1 is held by a U-shaped gripper in the container 2, passed between the platen roller 9 and the folding guide 10 from above the platen roller 9, and guided into the tray 21 along the feed path 13 between the side panels 4 and the rear plate 3.

After the recording paper 1 is folded five to six times along the perforations 5, the folded recording paper 1 is aligned with the guides 24 out of any positional misalignment so as to be initially positioned in the tray 21 over the assisting member 23 mounted on the recording paper supporting surface 22.

Thereafter, the thermal head 7 is applied against the platen roller 9 with the recording paper 1 placed therebetween and held under a prescribed pressure by the pressing spring 6. Then, the thermal head 7 and the platen roller 9 are driven for recording operation.

Figure 1A:
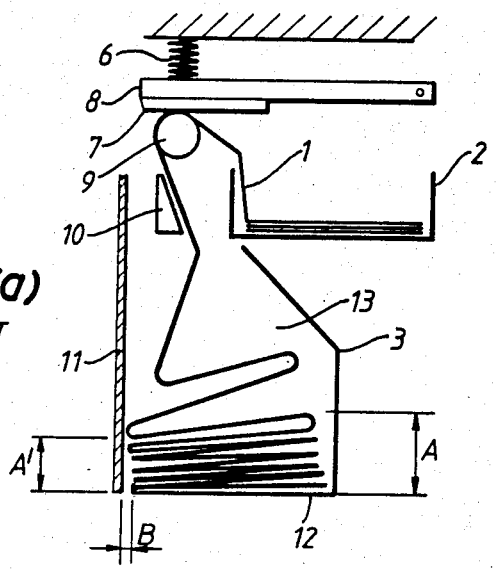
FIGS. 1(a) and 1(b) are sectional side and front elevational views, respectively, of a prior recorder using fanfold recording paper.
Figure 1B:
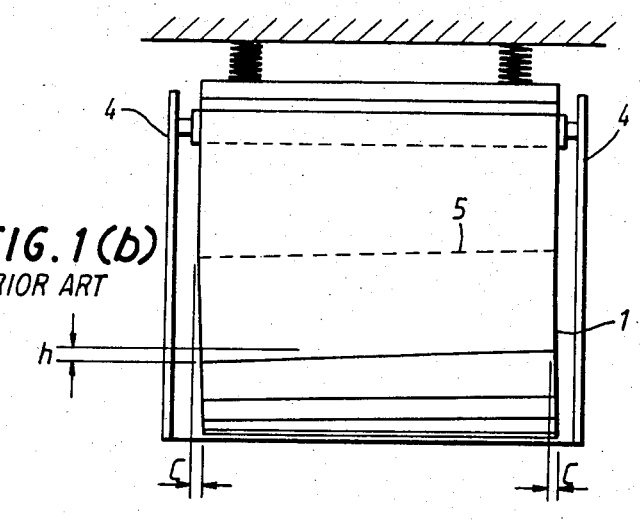

The recording paper 1 on which desired data items have been recorded is fed and successively folded along the perforations 5 so as to be stored in the tray 21. The recording paper 1 is folded on itself while the central portion of the recording paper 1 in its transverse direction is being raised by the assisting member 23 as shown in FIG. 2(b) with the transverse ends of the paper hanging down. The recording paper 1 as it is newly folded on itself is placed on the recording paper already stacked with the perforations 5 kept horizontally, so that the recording paper 1 can be folded reliably along the perforations 5. At this time, since the recording paper 1 has been initially positioned in alignment with the guides 24, the recording paper 1 is not positionally deviated in the transverse direction thereof such that the perforations 5 are not subjected to the inclination h as shown in FIG. 1(b).

This, together with the operation effected by the assisting member 23, allows the recording paper to be stably and reliably folded and properly stored in the tray 21.

Since the recording paper supporting surface 22 of the tray 21 has the inclined surface 25 slanted upwardly toward its front side, the tendency for the height of the stacked recording paper to be reduced on the front side is compensated for. As a result, the upper surface of the piled recording paper 1 in the tray 21 is kept substantially horizontal to guard against falling of the pile of the folded recording paper in the forward direction as shown in FIG. 1(a). Accordingly, the pile of the folded recording paper will not collapse down as unfolded sheets out of the tray when the front transparent panel 11 is opened.

The present invention is not limited to the above embodiment, but may be modified in various ways, as next described.

For example, the assisting member 23 may be inclined such that its height is greater on the front side than on the rear side, while the recording paper supporting surface may lie horizontal (see FIG. 6). Designated in FIG. 6 at 51 are guides for initially positioning the recording paper.

Alternatively, as illustrated in FIGS. 3(a) and 3(b), an assisting member may include a plurality of pins 40, and the rear pin may be lower than the front pin.

In the variation shown in FIG. 4, a guide for initially positioning the recording paper may include a table-like land 24' disposed on the recording paper supporting surface 22 and having a width substantially equal to that of the fanfold recording paper 1, the table-like land 24' extending transversely equally on both sides of the center in the transverse direction of the recording paper. The guides 24 as shown in FIG. 2(b) may be replaced with marking lines on the recording paper supporting surface 22.

Alternatively, the guide 24 or marking line may be provided only on one side of the recording paper.

In the embodiment of FIGS. 2(a) and 2(b), the recording paper supporting surface 22 itself has the inclined surface 25. However, a plate having an inclined upper surface may be mounted on the recording paper supporting surface 22 so that the degree of inclination can be varied by changing such plates.

As shown in FIGS. 5(a) and 5(b), a recording paper supporting plate 31 with a recording paper supporting surface may be pivotably mounted in the tray 12 by hinges 32 at a rear side of the plate 31. A slider 33 for varying the degree of inclination may be mounted on the bottom plate of the tray 21. The inclination of the recording paper supporting plate 31 which is higher on its front side may be varied by displacing the slider 33 back and forth. This arrangement allows the recorder to employ various types of recording paper having different pile heights.

With the present invention, as described above, the recorder includes a recording paper tray provided with an assisting member for increasing the height of a transverse central portion of fanfold recording paper stored as folded in the tray to a prescribed height, initial positioning guides for eliminating any transverse positional deviation of the recording paper as it is initially positioned in the tray, and an inclined recording paper supporting surface which is higher on a front side than on a rear side. When fanfold recording paper is newly placed as folded in the tray, the recording paper is not subjected to transverse positional deviation, so that perforations along which the recording paper can be folded will not be tilted. The assisting member enables recording paper being folded on itself to first contact the central bump of recording paper already piled up, with the result that the recording paper being folded is placed on the recording paper already folded with the perforations kept horizontal. Therefore, the recording paper can reliably be folded along the perforations, and can stably and accurately be fed over a long period of time. The upwardly inclined recording paper supporting surface of the tray is effective in compensating for the tendency for the pile of the recording paper to be lowered on the front side. As a consequence, the upper surface of the stack of the folded recording paper stored in the tray is kept substantially horizontal to guard against forward tilting of the recording paper stack against the front transparent panel, so that the stack of the folded recording paper will be prevented from collapsing down as unfolded sheets out of the tray when the front transparent panel is opened. With the simple functional elements added according to the present invention, the recording paper can be fed and stored, after data items have been recorded, stably and reliably in the recorder. The recorder which employs the fanfold recording paper can therefore be operated with increased efficiency and reliability.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A recorder comprising:
   a supply of fanfold recording paper, said paper being divided by folds into lengths and having a width extending in a transverse direction to said lengths and parallel to said folds;
   a tray for receiving said paper;
   a thermal head for recording data on said paper;
   a paper supporting surface in said tray,
   an assisting member disposed substantially in the widthwise center of and on said paper supporting surface and extending over only a portion of the width of the received recording paper and having a length substantially equal to the length of said paper between folds, for assisting the folding of said recording paper by raising the central portion of the width of the stack of the folded fanfold recording paper to a prescribed height, and
   guides located on the paper supporting surface of the tray and spaced at an interval substantially equal to the width of the recording paper for initially positioning the recording paper on the paper supporting surface,
   wherein at least either the assisting member and the paper supporting surface are inclined for increasing the height of the stacked recording paper at a front side thereof in a direction normal to the width of the recording paper.

2. A tray according to claim 1 wherein said tray further comprises:
   pivot means disposed at a rear side of said tray for pivotably moving said tray, and
   a slider slidably attached to an underside of said support surface for varying the degree of inclination of said tray.

* * * * *